Patented Dec. 18, 1945

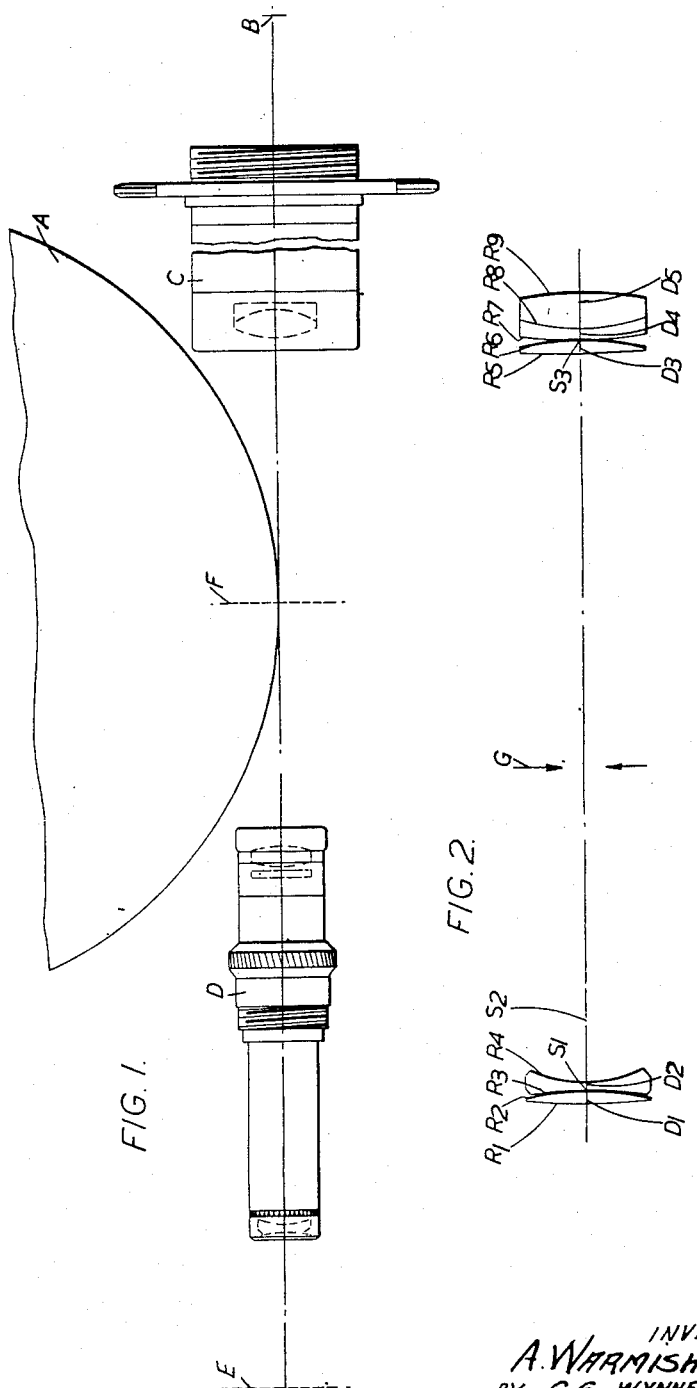

2,391,210

UNITED STATES PATENT OFFICE 2,391,210

OPTICAL OBJECTIVE

Arthur Warmisham and Charles Gorrie Wynne, Leicester, England, assignors to Kapella Limited, Leicester, England, a company of Great Britain Application August 3, 1942, Serial No. 453,396
In Great Britain July 31, 1941

15 Claims. (Cl. 88—57)

This invention relates to optional objectives of the kind corrected for spherical and chromatic aberrations, coma, astigmatism and distortion, and comprising a convergent rear member and a divergent front member separated by a distance greater than the equivalent focal length of the objective. It should be made clear that the front of the objective is to be understood as the side nearer to the longer conjugate in accordance with the usual convention irrespective of the direction in which the light passes through the objective.

It is known to employ objectives of this kind for various purposes including photography, projection and microscope investigation, with the convergent member placed nearer to the object in order to obtain a long back focal length, and amongst such known arrangements may be mentioned that described in British patent specification No. 388,215, standing in the names of one of the present applicants and another. Such prior objective is especially intended for a dissecting microscope or like projection apparatus and is well corrected over a wide angular field for curvature of field and distortion as well as for the other aberrations.

The present invention has for its object to modify such prior known objective to make it suitable for profile projection, retaining the long back focal length and at the same time considerably simplifying the construction of the objective, such simplification being practicable since the wide angular field for which the prior objective is corrected is not required for such profile projection.

In the objective according to the present invention the convergent rear member comprises two convergent components of which one is simple and one is compound, and a stop (or its equivalent) is provided substantially in a position at which rays parallel to the axis entering the objective from the rear will come to a real focus on the axis, the objective being corrected with respect to such stop position.

Whilst it will usually be preferable to employ an actual stop, this is not essential when collimated light is used for illuminating the object whose profile is to be investigated, for in such case the objective will form a real image of the source of light at the stop position and, if the size of the source is suitable, such image will itself act satisfactorily as the equivalent of an actual stop for the purposes of the invention. Conversely, when an actual stop is provided, it is not essential to use collimated light (although it is preferable to do so) for provided the incident light is scattered, the stop will act to select the desired rays and to avoid the effects of parallax and of bad focussing on the image sizes. In fact considerable displacement of the object in the axial direction will not disturb the accuracy of measurements made on the image.

The axial separation between the two members of the objective is preferably greater than twice the equivalent focal length of the objective, and the most satisfactory results are obtained when this separation is greater than 2.5 times the equivalent focal length. With this arrangement, the divergent front member, which is conveniently in the form of a doublet with its two elements preferably not cemented together, acts to locate the two nodal planes of the objective considerably behind the rear surface of the convergent rear member, thus giving the desired long back focal length. The large clearance thus obtained between the rear surface of the objective and the object plane is especially convenient for the examination of a section profile (such for example as that of the working edge of a grinding wheel of large radius) which is relatively inaccessible.

The compound component of the convergent rear member preferably has a dispersive cemented contact surface. In one convenient arrangement this rear member comprises a compound convergent component with a dispersive cemented surface, located closely behind a convergent single element.

As has been mentioned, the objective according to the invention is intended more especially for projecting an image of the profile of an object illuminated by collimated light, and a preferred practical arrangement of profile projection apparatus incorporating the objective is illustrated diagrammatically in the accompanying drawing, in which Figure 1 shows the complete projection apparatus, and Figure 2 illustrates on a larger scale the objective employed in the apparatus of Figure 1.

The apparatus in Figure 1 is shown by way of example in use for projecting the image of the profile of a section of the working edge of a grinding wheel A. The edge of the wheel is illuminated by collimated light directed tangentially past it by means of an illuminating device comprising a source of light B of small size and a collimator C. The objective D acts to project the desired image on to its image plane E, the objective being mounted so that its object plane F cuts the wheel in the section whose profile is to be examined.

The objective D itself is shown clearly in Figure 2 and consists of a divergent front member in the form of an uncemented doublet and a convergent rear member in the form of a compound convergent component disposed close behind a convergent simple element. A stop G is provided at the position at which a real axial image of the light source is formed by the convergent rear member, this stop preferably having a diameter slightly larger than the image of the light source in such focal plane, in order to avoid diffraction difficulties.

Numerical data for this objective are given in the following table in which $R_1 R_2 \ldots$ represent the radii of curvature of the individual surfaces counting from the front (the positive sign indicating that the surface is convex to the front and the negative sign that it is concave thereto) $D_1 D_2 \ldots$ represent the axial thicknesses of the individual lens elements, and $S_1 S_2 S_3$ represent the axial separations between the various components. The tables also give the mean refractive indices $n_D$ (for the D-line) and the Abbé V numbers of the glasses used.

Equivalent focal length, 1.0076  Relative aperture, F/16

| Radius | Thickness or air separation | Refractive index $n_D$ | Abbé V number |
| --- | --- | --- | --- |
| $R_1 = +4.140$ | | | |
| | $D_1 = .040$ | 1.621 | 36.1 |
| $R_2 = -.876$ | | | |
| | $S_1 = 0$ | | |
| $R_3 = -1.1105$ | | | |
| | $D_2 = .040$ | 1.5158 | 64.1 |
| $R_4 = +.5235$ | | | |
| | $S_2 = 2.833$ | | |
| $R_5 = +6.734$ | | | |
| | $D_3 = .058$ | 1.5158 | 64.1 |
| $R_6 = -9.345$ | | | |
| | $S_3 = 0$ | | |
| $R_7 = +1.975$ | | | |
| | $D_4 = .040$ | 1.652 | 33.5 |
| $R_8 = +.6849$ | | | |
| | $D_5 = .150$ | 1.5158 | 64.1 |
| $R_9 = -1.5398$ | | | |

Distance of object behind $R_9 = 3.022$.
Distance of image in front of $R_1 = 1.8095$.
Distance of stop position in front of $R_5 = 1.610$.

This example is corrected for a magnification X2½ and is especially suitable for use in conjunction with an eyepiece as a profile projection microscope for the examination of profiles of objects whose shape or mounting necessitates a relatively large clearance distance between the profile and the objective. The objective can however also be corrected for a higher magnification for use for projection on to a screen.

In this example the convergent rear member comprises a simple convergent component in front of and in axial contact with a compound convergent component whose single contact surface is cemented and is dispersive, whilst the divergent front member consists of an uncemented doublet in which the cooperating surfaces of the two elements are in axial contact but have somewhat different radii of curvature. The stop, lying between the two members, has a diameter .107 in this example.

It should perhaps be explained that although the image distance from $R_1$ is less than the object distance from $R_9$, yet the surface $R_1$ is nevertheless the front of the objective since the conjugates are calculated from the positions of the nodal planes which are both located considerably behind $R_9$.

It will be appreciated that the above-described arrangement has been given by way of example only and that the invention may be carried into practice in various ways. For example the divergent front member may have various forms other than the uncemented doublet described.

What I claim as my invention and desire to secure by Letters Patent is:

1. A profile projection objective for profile projection corrected for spherical and chromatic aberrations, coma, astigmatism and distortion, and comprising in axial alignment a divergent front member, a convergent rear member which is separated from the front member by an axial air distance greater than twice the equivalent focal length of the objective but not more than 3.5 and consists of two convergent components of which one is simple and one is compound, and means constituting an effective stop located substantially in a position at which rays parallel to the axis entering the objective from the rear will come to a real focus on the axis, the objective being corrected with respect to such stop position.

2. A profile projection objective as claimed in claim 1, in which the axial air separation between the front and rear members is greater than 2.5 times the equivalent focal length of the objective.

3. A profile projection objective as claimed in claim 1, in which the compound component of the convergent rear member includes a dispersive cemented contact surface.

4. A profile projection objective as claimed in claim 1, in which the convergent rear member is separated from the front member by an axial distance greater than 2.5 times the equivalent focal length of the objective, and comprises a convergent cemented doublet having a dispersive contact surface, and a convergent simple component located close to such doublet.

5. A profile projection objective as claimed in claim 1, in which the divergent front member comprises an uncemented doublet.

6. A profile projection objective as claimed in claim 1, in which the divergent front member comprises an uncemented doublet and is separated from the rear member by an axial distance greater than 2.5 times the equivalent focal length of the objective.

7. A profile projection objective for profile projection corrected for spherical and chromatic aberrations, coma, astigmatism and distortion, and comprising in axial alignment a divergent front member, consisting of an uncemented doublet, a convergent rear member which is separated from the front member by an axial distance greater than twice the equivalent focal length of the objective but not more than 3.5 and consists of a convergent cemented doublet and a convergent simple component, and means constituting an effective stop located substantially in a position at which rays parallel to the axis entering the objective from the rear will come to a real focus on the axis, the objective being corrected with respect to the stop position.

8. Optical projection apparatus for projecting an image of a profile of an object comprising a source of light of small size, a collimator for directing a collimated beam of light past the object, and an objective for projecting an image of the profile of the object, such objective consisting of a divergent front member and a convergent rear member separated from the front member by an axial distance greater than twice the equivalent focal length of the objective but not more than 3.5 and having two convergent components one is simple and one of which is compound, the objective being corrected with respect to an effective stop position in a position at which rays parallel to the axis entering the objective from the rear will come to a real focus on the axis.

9. Optical projection apparatus as claimed in claim 8, in which the axial air separation between the front and rear members is greater than 2.5 times the equivalent focal length of the objective.

10. Optical projection apparatus as claimed in claim 8, in which the compound component of the convergent rear member includes a dispersive cemented contact surface.

11. Optical projection apparatus as claimed in claim 8, in which the convergent rear member is separated from the front member by an axial distance greater than 2.5 times the equivalent focal length of the objective, and comprises a convergent cemented doublet having a dispersive contact surface, and a convergent simple component located close to such doublet.

12. Optical projection apparatus as claimed in claim 8, in which the divergent front member comprises an uncemented doublet.

13. Optical projection apparatus as claimed in claim 8, in which the divergent front member comprises an uncemented doublet and is separated from the rear member by an axial distance greater than 2.5 times the equivalent focal length of the objective.

14. Optical projection apparatus for projecting an image of the profile of an object, comprising a source of light of small size, a collimator for directing a collimated beam of light past the object, and an objective as claimed in claim 7 for projecting an image of the profile of the objective.

15. An optical objective having numerical data substantially as set forth in the following table wherein R=the radius, D=the thickness or air separation and S=the axial separation:

| Equivalent focal length, 1.0076  Relative aperture, F/16 | | | |
|---|---|---|---|
| Radius | Thickness or air separation | Refractive index $n_D$ | Abbé V number |
| $R_1 = +4.140$ | $D_1 = .040$ | 1.621 | 36.1 |
| $R_2 = -.876$ | $S_1 = 0$ | | |
| $R_3 = -1.1105$ | $D_2 = .040$ | 1.5158 | 64.1 |
| $R_4 = +.5235$ | $S_2 = 2.833$ | | |
| $R_5 = +6.734$ | $D_3 = .058$ | 1.5158 | 64.1 |
| $R_6 = -9.345$ | $S_3 = 0$ | | |
| $R_7 = +1.975$ | $D_4 = .040$ | 1.652 | 33.5 |
| $R_8 = +.6849$ | $D_5 = .150$ | 1.5158 | 64.1 |
| $R_9 = -1.5398$ | | | |

Distance of object behind $R_1 = 3.022$.
Distance of image in front of $R_1 = 1.8095$.
Distance of stop position in front of $R_5 = 1.610$.

ARTHUR WARMISHAM.
CHARLES GORRIE WYNNE.